(12) United States Patent
Kage et al.

(10) Patent No.: US 6,891,780 B1
(45) Date of Patent: May 10, 2005

(54) DISK PLAYER

(75) Inventors: Shingo Kage, Hyogo (JP); Yasunari Toyama, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/719,226

(22) PCT Filed: Apr. 10, 2000

(86) PCT No.: PCT/JP00/02341
§ 371 (c)(1),
(2), (4) Date: Dec. 11, 2000

(87) PCT Pub. No.: WO00/62289
PCT Pub. Date: Oct. 19, 2000

(30) Foreign Application Priority Data

Apr. 12, 1999 (JP) .......................... P11-103541

(51) Int. Cl.[7] ............................................. G11B 17/04
(52) U.S. Cl. ...................................................... 369/13
(58) Field of Search ........................ 369/13, 77.1, 75.1, 369/75.2; 360/99.06, 99.07, 97.02, 192

(56) References Cited

U.S. PATENT DOCUMENTS

| | | | |
|---|---|---|---|
| 5,036,509 A | * 7/1991 | Kobayashi et al. | 369/75.2 |
| 5,204,849 A | * 4/1993 | Yamada et al. | 369/75.2 |
| 6,028,831 A | * 2/2000 | Scholz et al. | 369/75.2 |
| 6,392,980 B1 | * 5/2002 | Sato et al. | 369/192 |
| 6,469,972 B1 | * 10/2002 | Morimoto et al. | 369/77.1 |
| 6,542,453 B1 | * 4/2003 | Yamada et al. | 369/77.1 |

FOREIGN PATENT DOCUMENTS

| | | |
|---|---|---|
| EP | 1 087 390 | 3/2001 |
| JP | 2-239461 | 9/1990 |
| JP | 3-280257 | 12/1991 |
| JP | 4-93937 | 8/1992 |
| JP | 8-45156 | 2/1996 |
| JP | 10-275391 | 10/1998 |

* cited by examiner

*Primary Examiner*—Tianjie Chen
(74) *Attorney, Agent, or Firm*—McDermott Will & Emery

(57) ABSTRACT

The disc player according to the present invention is provided with a disc selecting lever 8 which is oscillatably journaled on both ends along the direction perpendicular to a disc transportation direction X. Furthermore, on both ends of the disc selecting lever 8 are provided projecting portions 8a, 8b projecting toward the disc side, respectively. When a large-diameter disc is transported, both of the projecting portions 8a, 8b abut on the disc to push down the disc, while on the other hand, when a small-diameter disc is transported, both or at least one of the projecting portions 8a, 8b does not abut on the disc. In addition, a large-diameter latch member 5 for receiving and latching the large-diameter disc having reached a terminal end of transportation after being pushed down by the projecting portions 8a, 8b, and a small-diameter latch member 6 for receiving and latching the small-diameter disc having reached the terminal end of transportation are provided. In this way, decrease in whole thickness is achieved.

3 Claims, 18 Drawing Sheets

F I G. 1
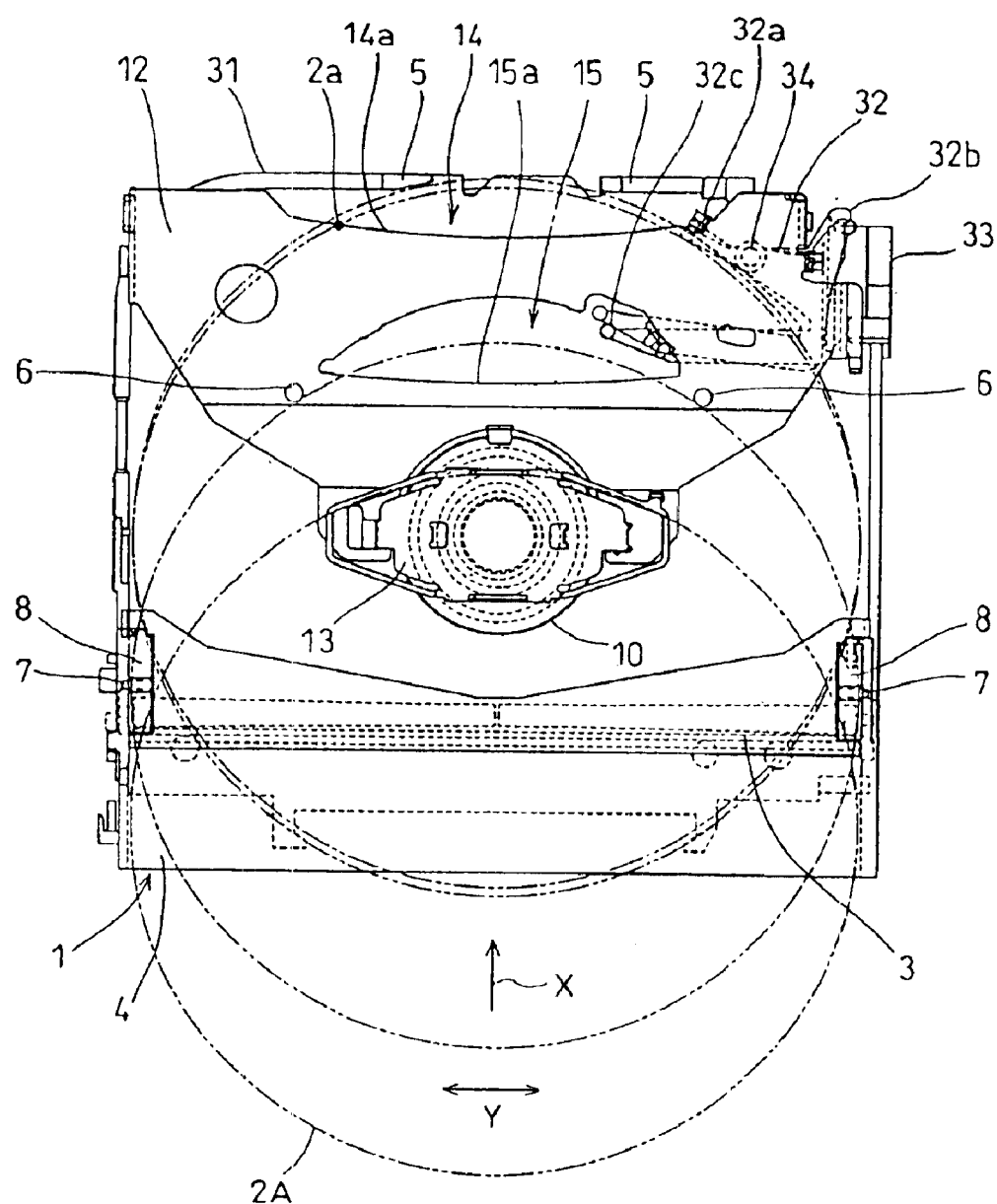

F I G. 10
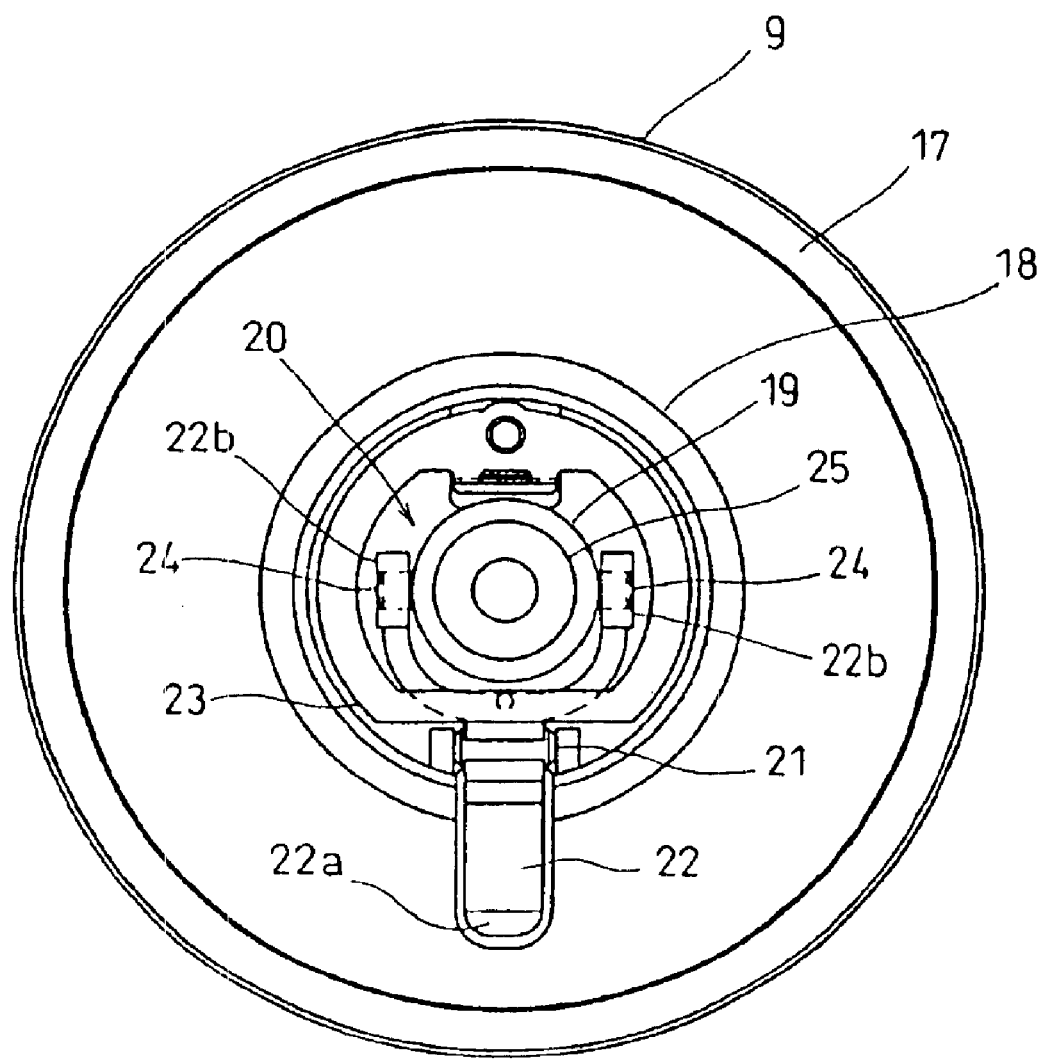

F I G. 11
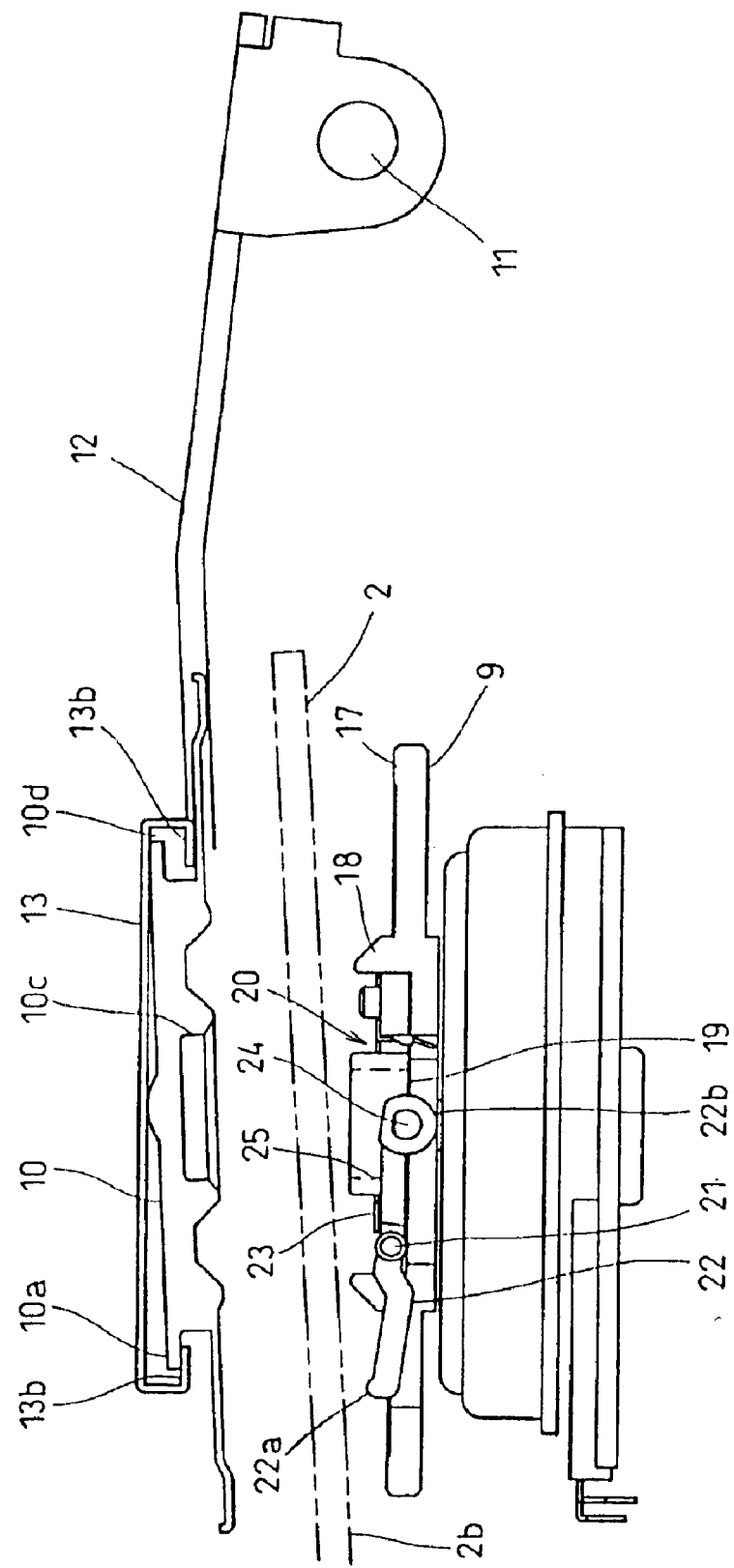

DISK PLAYER

TECHNICAL FIELD

The present invention relates to a disc player used, for instance, at the time of playback of a compact disc.

BACKGORUND ART

Conventionally, in a disc player such as compact disc player, it is general that both large-diameter and small diameter discs may be played back. As one example of a disc player having such a configuration, that disclosed in Japanese Unexamined Patent Publication JP-A 8-45156 (HEI-8, 1996) and having a plane structure and a side structure shown in FIGS. 13 to 16 is known.

In such a disc player, an oscillating lever 103 is oscillatably journaled by supporting shafts 102 provided at both end positions along the direction perpendicular to a transportation direction X of a disc 101, and the oscillating lever 103 is provided with a pin 103a on one end and a projecting portion 103b on the other end.

In the case where the disc to be transported and played back is a large-diameter disc 101A, as shown in FIGS. 13 and 14, the pin 103a abuts on the end surface of the disc 101A being transported. As a result of this, the projecting portion 103b pushes down the front end portion of the disc 101A so that the disc 101A is transported without being interfered by a small-diameter latch member 104, and the disc 101A having reached a playback position is received and latched by a large-diameter latch member 105.

In the case where the disc to be transported and played back is a small-diameter disc 101B, as shown in FIGS. 15 and 16, the pin 103a does not abut on the end surface of the disc 101B being transported. Therefore, the pin 103a is not operated so that the disc 101B is transported without being pushed down, and the disc 101B having reached the playback position is received and latched by the small-diameter latch member 104.

The reference numeral 106 in FIGS. 14 and 16 denotes a roller, and this roller 106 transports the disc 101 up to the playback position.

Furthermore, at the time of playback of a disc by the disc player, as seen from the side structure of a clamp mechanism shown in FIG. 17, it is necessary to position the disc 101 having been transported by the roller 106 directly on a turn table 107. However, in the course of transportation of the disc 101, a clamper 108 which presses the disc 101 against the turn table 107 becomes an obstacle during the transportation. In view of this, the following clamper supporting structure has been employed.

A clamper arm 110 of which proximal end portion is oscillatably journaled by a supporting shaft 109 is provided, and the clamper 108 is supported by an oscillating distal end portion of the clamper arm 110. In this way, the clamper 108 is separated from the turn table 107. Incidentally, the reference numeral 111 in FIG. 17 denotes a disc guide, and this disc guide 111 is disposed at the position opposing to the roller 106 and guides the disc 101 being transported.

Furthermore, in this type of disc player, it is necessary to make rotation centers of the disc 101, the turn table 107, and the clamper 108 into coincidence with each other. In order to achieve this, the following measure is applied. As shown in FIG. 18 in enlarged state, on the turn table 107 on which the disc 101 is to be placed, a projecting portion 107a which fits with a center hole 101a of the disc 101 is formed.

Furthermore, another projecting portion 107b is formed at the inside position in the radial direction of the projecting portion 107a.

As the clamper 108 presses the disc 101 against the turn table 107, the projecting portion 107a projects toward the clamper 108 side while penetrating through the center hole 101a of the disc 101. Then the projecting portion 107b comes into engagement with a recessed engagement portion 108a provided in the clamper 108. In this way, the rotation centers of the disc 101, the turn table 107 and the clamper 108 are brought into coincidence with each other.

In the conventional disc player having such a configuration, the following disadvantages arise. That is, the oscillating lever 103 is oscillatably journaled by the supporting shaft 102 provided at each end position of the direction perpendicular to the transportation direction X of the disc 101. The oscillating lever 103 is operated only when the disc 101 is the large-diameter disc 101A, and thus it is necessary to prevent the large-diameter disc 101A from being interfered by the small-diameter latch member 104.

For achieving the above, by making the oscillating lever 103 largely oscillate until the pin 103a enters into a transporting track of the disc 101A, the projecting portion 103a is brought into engagement with the disc 101A, thereby pushing down the front end portion of the transportation direction of the disc 101A to prevent interference by the latch member 104.

For this reason, there arises a disadvantage that the space for attachment of the oscillating lever 103 and for ensuring the oscillating track thereof becomes necessarily large. Moreover, in practice, the disc guide 111 is disposed below the oscillating lever 103, which leads the disadvantage that the entire thickness becomes large and low profiling cannot be achieved.

Furthermore, in the conventional configuration, a measure is taken such that the clamper 108 is separated from the turn table 107 by the clamper arm 110 so as not to be an obstacle during transportation of the disc 101 because if the disc 101 being transported is pressed against the turn table 107 while contacting with the clamper arm 110, the disc 101 will be injured. Therefore, also in this case, it is impossible to realize low profiling of the entire structure.

In the conventional configuration, it is necessary to make the rotation centers of the disc 101, the turn table 107 and the clamper 108 into coincidence with each other because if the disc 101 being transported is pressed against the turn table 107 while contacting with the clamper arm 110, the disc 101 will be injured, and hence the turn table 107 is provided with the projecting portion 107b which projects for fitting with the clamper 108 while fitting with the center hole 101a of the disc 101. However, in the case where such a projecting portion 107b is provided, because of the necessity of preventing the disc 101 from being injured, the clamper 108 must be further separated from the turn table 108, which makes it more difficult to realize low profiling of the entire structure.

The present invention was made in view of the above disadvantages, and it is an object of the invention to provide a disc player having a configuration which can easily realize low profiling of the entire structure.

DISCLOSURE OF INVENTION

A disc player according to the present invention enables the following operation by comprising: a roller for transporting a disc; a disc guide, provided opposite to the roller along a disc transportation direction, for guiding the disc being transported; a disc selecting lever provided at each end along the direction perpendicular to the disc transportation direction, of which center portion along the disc transportation direction is oscillatably journaled about an axis along the direction perpendicular to the disc transportation direction; projecting portions provided at both ends of the disc selecting lever along the disc transportation direction so as to project toward the disc side, both of which projecting portions abut on the disc to push down the disc when a large-diameter disc is transported, whereas both or at least one of which projecting portions does not abut on the disc when a small-diameter disc is transported; a large-diameter latch member for receiving and latching the large-diameter disc having reached a terminal end of transportation after being pushed down by the projecting portions; and a small-diameter latch member for receiving and latching the small-diameter disc having reached a terminal end of transportation.

In the case where the disc to be transported is a large-diameter disc, the disc is pushed down while both of the projecting portions of the disc selecting lever abut on the disc, so that the large-diameter disc pushed down is transported without being interfered by the small-diameter latch member, and then received and latched by the large-diameter latch member. On the contrary, in the case of a small-diameter disc, since both of the projecting portions of the disc selecting lever do not abut or at least one of the projecting portions abuts, the disc is transported without being pushed down and then latched by the small-diameter latch member.

According to such a configuration, it is possible to determine whether the disc is of large-diameter or small-diameter by the disc selecting lever which is significantly downsized compared to the conventional oscillating lever and to reliably transport the large-diameter and small-diameter discs to the respective playback positions.

Furthermore, it is preferable that the disc player according to the present invention is configured in the following manner.

The disc player according to the present invention further comprises: a turn table on which the disc transported by the roller is placed, for allowing rotating operation of the disc; a clamper arm journaled so as to be capable of oscillating; a clamper rotatably supported on the oscillating distal end side of the clamper arm, which clamper separates from the turn table at the time of transportation of the disc in accordance with oscillating operation of the clamper arm, whereas presses the disc against the turn table when the disc is placed on the turn table; and an opening provided in the clamper arm, through which a front end portion in the transportation direction of the disc being transported penetrates and projects therefrom.

This configuration allows the front end portion of the disc being transported to be projected while penetrating through the opening of the clamper arm, resulting that the disc of which front end portion is pushed by the clamper arm will not be pressed against the turn table.

Furthermore, in this case, it is more preferable that the end edge located on the disc guide side of the opening has a curved shape which abuts only both ends of the disc, and when such a shape is employed, such a disadvantage that the entire surface of the disc is injured cannot occur.

Incidentally, it is preferable that the disc player according to the present invention is configured in the following manner.

The disc player according to the present invention further comprises: a turn table on which the disc transported by the roller is placed, for allowing rotating operation of the disc; a clamper arm journaled so as to be capable of oscillating; a clamper holding plate provided on the oscillating distal end side of the clamper arm; a clamper rotatably supported on the clamper arm via the clamper holding plate, which clamper separates from the turn table at the time of transportation of the disc in accordance with oscillating operation of the clamper arm, whereas presses the disc against the turn table when the disc is placed on the turn table; a restricting member for positioning and restricting one end portion of the clamper having separated from the turn table; and a supporting portion provided in the clamper arm, for positioning and supporting the other end portion of the clamper having separated from the turn table, the clamper holding plate being provided with an energizing portion for energizing the clamper toward the direction of separating from the clamper arm.

According to this configuration, the clamper having separated from the turn table can be reliably supported by the restricting member and the supporting portion. Therefore, it is possible to prevent the disc being transported from abutting the clamper without increasing the distance of separation of the clamper with respect to the turn table so much.

Incidentally, it is preferable that the clamper is supported by the clamper arm in the condition that more or less movement along the oscillating direction of the clamper arm is allowed, and in such a case, mechanical allowance is secured between the clamper and the clamper arm, resulting that an advantage can be ensured such that it is possible to prevent the disc from being injured by providing sufficient space for transportation of the disc in addition that it is possible to keep the position of the clamper in a stable manner.

Incidentally, it is preferable that the disc player according to the present invention is configured in the following manner.

The disc player according to the present invention further comprises: a turn table on which the disc transported by the roller is placed, for allowing rotating operation of the disc; a clamper arm journaled so as to be capable of oscillating; a clamper holding plate provided on the oscillating distal end side of the clamper arm; and a clamper rotatably supported on the clamper arm via the clamper holding plate, which clamper separates from the turn table during transportation of the disc in accordance with oscillating operation of the clamper arm, whereas presses the disc against the turn table when the disc is placed on the turn table; the turn table being provided with a disc supporting portion for supporting the disc; a projecting portion provided inwardly in the radial direction from the disc supporting portion, to be fitted into a center hole of the disc; and a clamper engagement portion provided inwardly in the radial direction from the projecting portion, performing advancing/retracting operation along the axial direction of the turn table, the clamper being provided with a turn table engagement portion to be engaged with the clamper engagement portion having performed advancing operation.

Incidentally, it is preferable that the clamper engagement portion has an operation lever with one end portion projecting above the disc supporting portion, and the other end portion performing advancing/retracting operation with respect to the disc supporting portion in accordance with presence/absence of the pushing operation of the disc with respect to the one end portion; a main body member connected to the other end portion of the operation lever; and energizing means for energizing the other end portion of the operation lever toward the direction separating from the disc supporting portion.

According to the above configuration, since the clamper engagement portion which is one of obstacles at the time of transportation of the disc performs retracting operation into the projecting portion during transportation of the disc, a disadvantage that the disc is injured will not occur.

The disc placed on the disc supporting portion of the turn table is positioned by means of the projecting portion fitted with the center hole of the disc in the condition that the rotation centers thereof are coincident with each other. Furthermore, since the clamper for pressing the disc against the turn table is positioned in the condition that the rotation centers of the turn table engagement portion of the clamper and the main body member of the clamper engagement portion having performed advancing operation are coincident with each other as they come into engagement, such an advantage that the rotation centers of the disc, the turn table and the clamper can be easily made into coincidence with each other is ensured.

BRIEF DESCRIPTION OF DRAWINGS

FIG. 1 is a plane structural view of a disc player according to an embodiment of the present invention, showing the case where a disc to be transported is of large-diameter.

FIG. 10 is a plane structural view of a turn table provided for the disc player according to yet another improved embodiment, in a standby state.

FIG. 11 is a side structural view of the turn table provided for the disc player according to yet another improved embodiment, in a standby state.

BEST MODE FOR CARRYING OUT THE INVENTION

In the followings, the best embodiment of the present invention will be described in detail with reference to drawings. The present invention is explained while being applied to a compact disc player, however, the present invention is not limited to such use.

Figure 2:
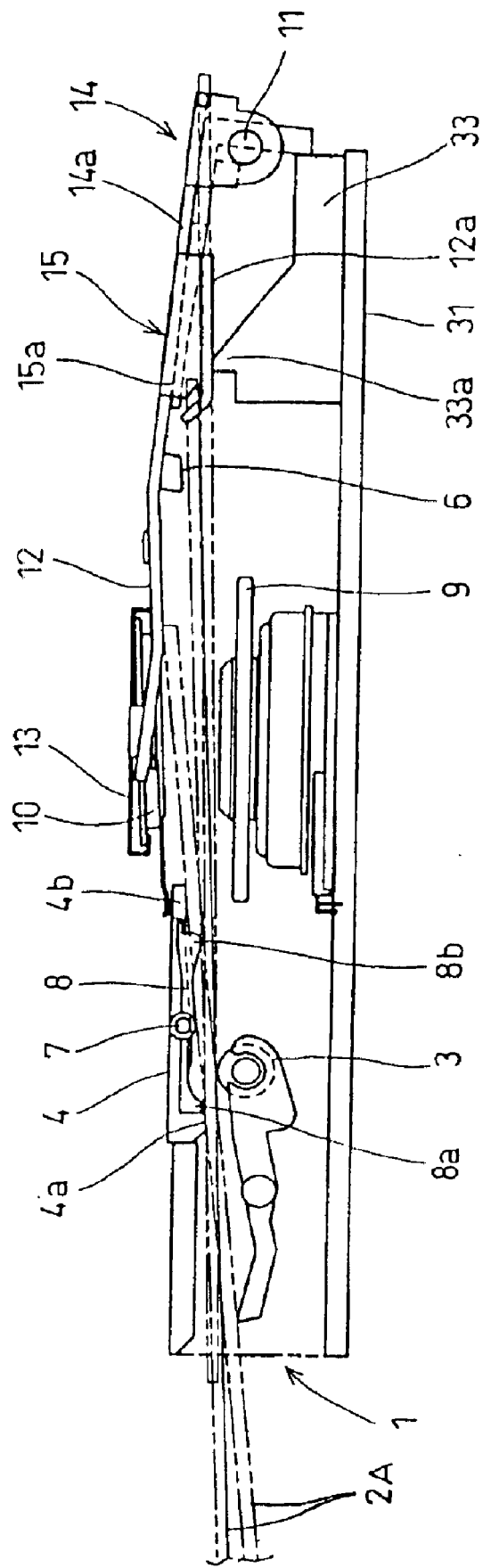
FIG. 2 is a side structural view of the disc player according to the embodiment, showing the case where a disc to be transported is of large-diameter.
Figure 3:
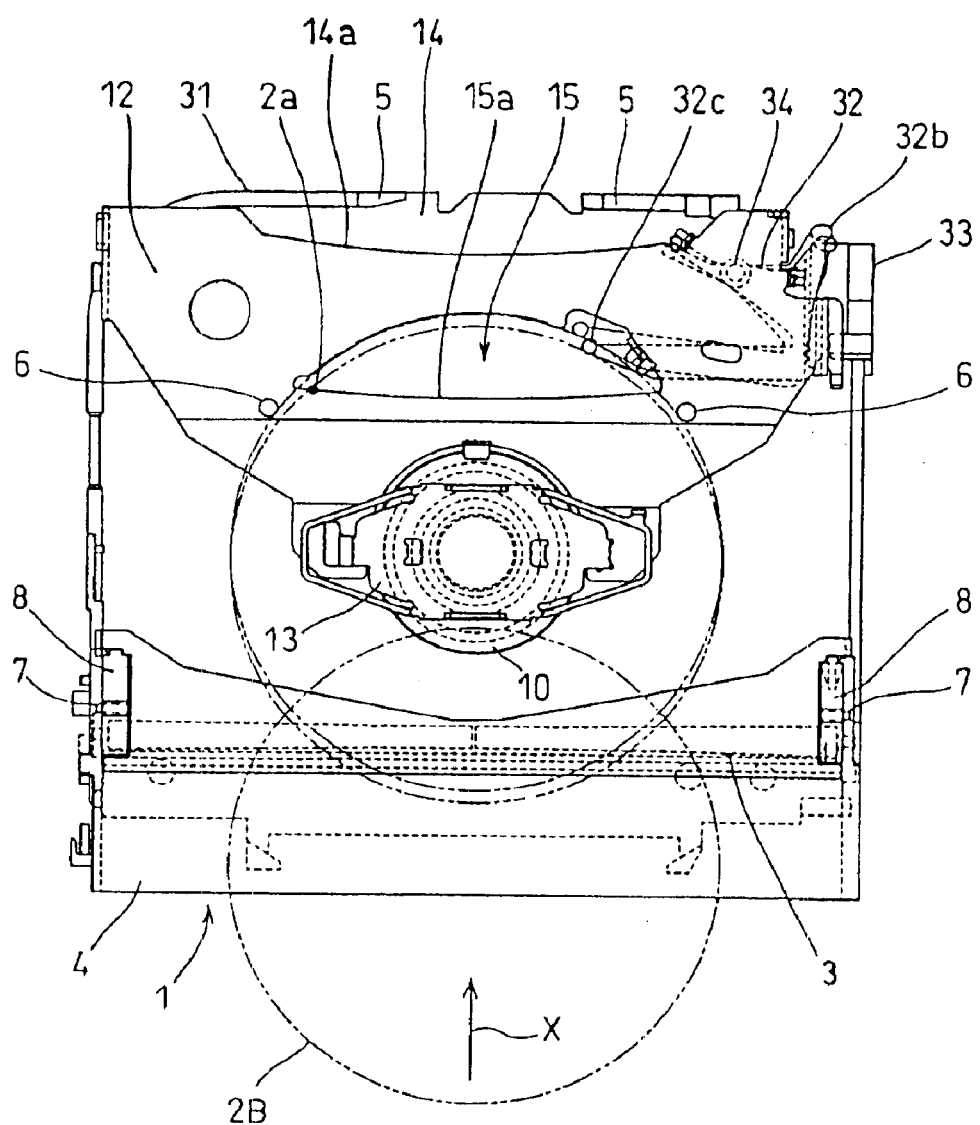
FIG. 3 is a plane structural view of the disc player according to the embodiment, showing the case where a disc to be transported is of small-diameter.
Figure 4:
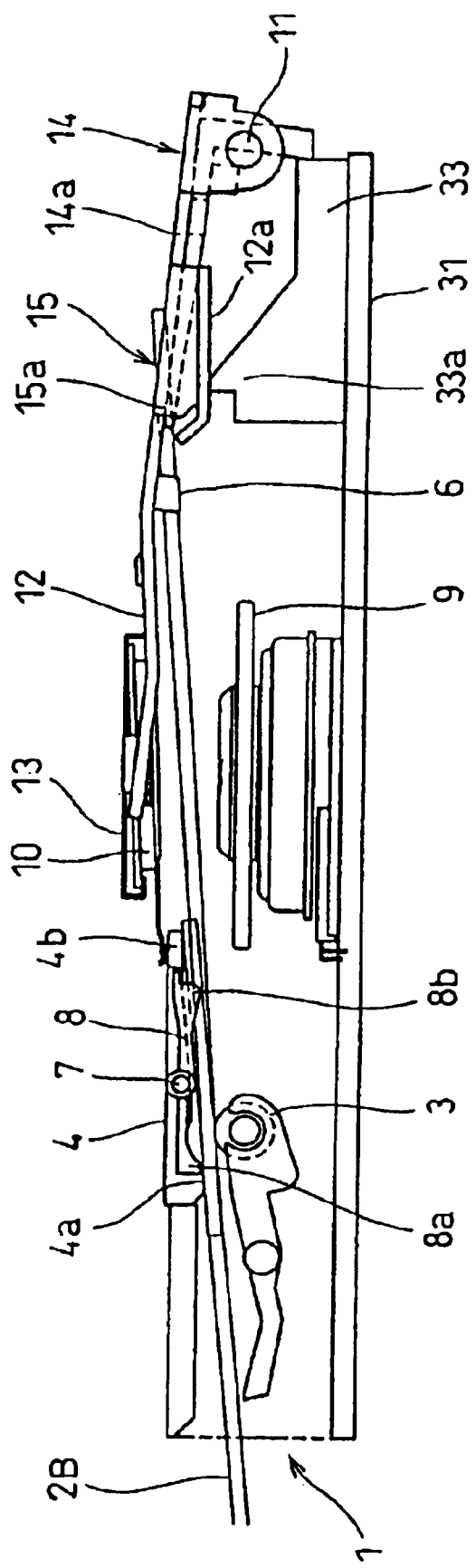
FIG. 4 is a side structural view of the disc player according to the embodiment, showing the case where a disc to be transported is of small-diameter.
Figure 5:
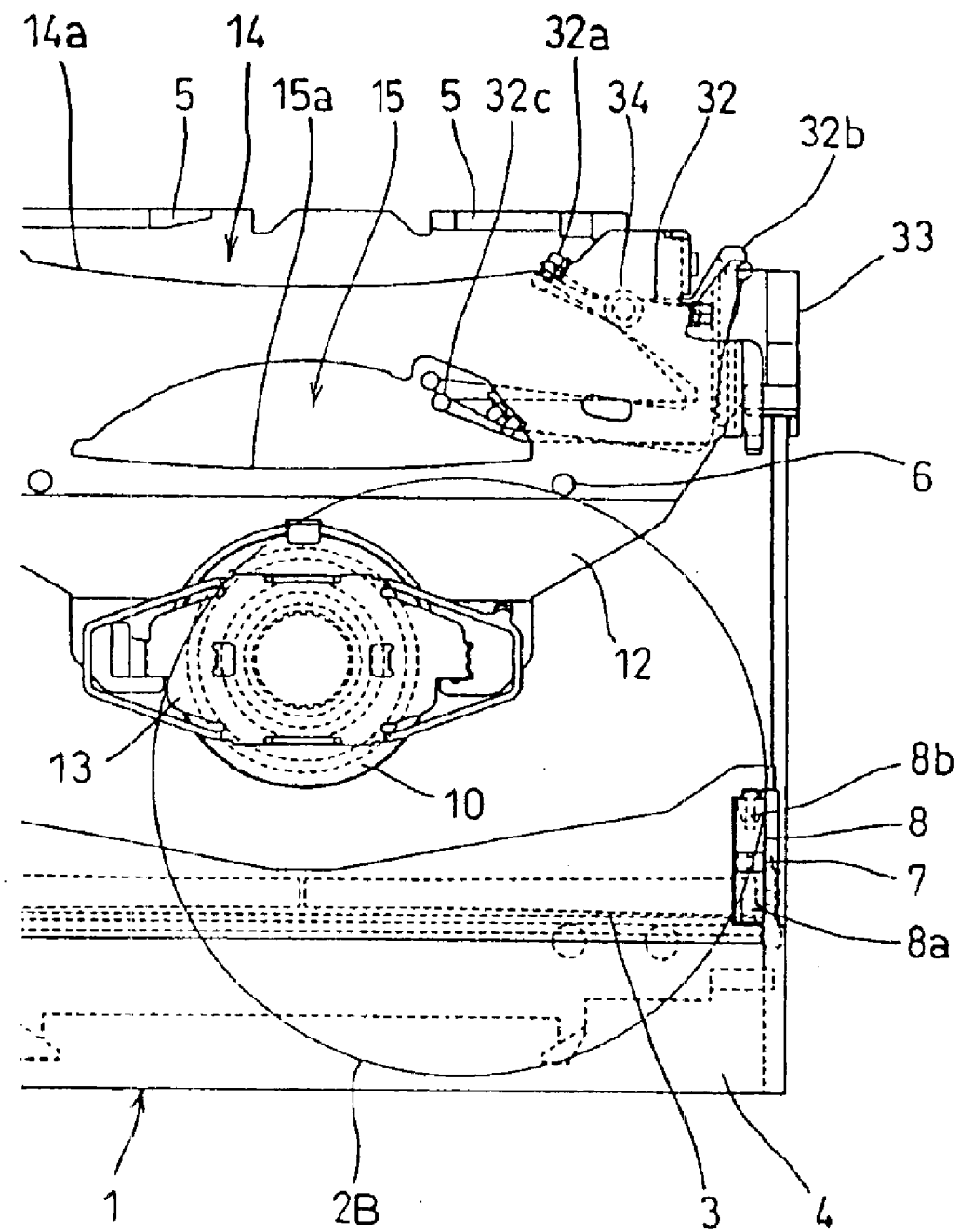
FIG. 5 is a plane structural view of the disc player according to the embodiment, showing the intermediate state in the case where the small-diameter disc to be transported is transported with being deviated in its position.
Figure 6:
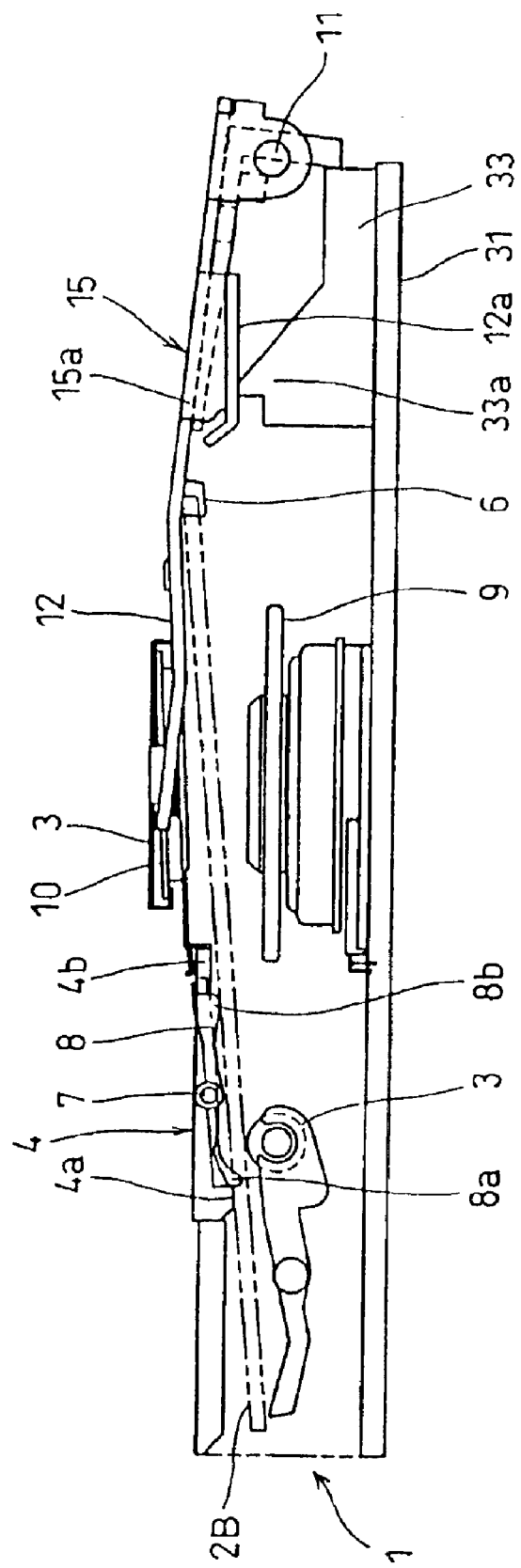
FIG. 6 is a side structural view of the disc player according to the embodiment, showing the intermediate state in the case where the small-diameter disc to be transported is transported with being deviated in its position.

FIGS. 1 and 3 are plane structural views of a disc player according to the embodiment, FIGS. 2 and 4 are side structural views of the disc player, and FIGS. 1 and 2 show the state where the disc to be transported is of large-diameter, while FIGS. 3 and 4 show the state where the disc to be transported is of small-diameter. The plane structural view of FIG. 5 and the side structural view of FIG. 6 are modified examples of FIGS. 3 and 4, respectively, and these FIGS. 5 and 6 show the case where a disc of small-diameter is transported while being deviated in its position.

This disc player comprises a roller 3, a disc guide 4 and latch members 5, 6. The roller 3 transports a disc 2 having been inserted from an insertion opening 1 along a transportation direction X by rotating operation. The disc guide 4 is disposed above the roller 3 so as to be opposed to the roller 3. The disc guide 4 guides the disc 2 being transported by sandwiching the disc 2 between the roller 3 and the disc guide 4. The disc guide 4 is provided with guide portions 4a, 4b. The guide portions 4a, 4b are provided at both ends of the guide 4 along the transportation direction X. The guide portions 4a, 4b are provided on the side of the roller of the guide 4. The guide portion 4a located on the front side of the transportation direction x more projects toward the roller side than the guide portion 4b of the rear side. The latch members 5, 6 receives and latches a large-diameter disc 2A and a small-diameter disc 2B having been transported to a playback position, respectively. The latch member 5 is specialized for the large-diameter disc 2A, and the latch member 6 is specialized for the small-diameter disc 2B. The latch member 5 (for large-diameter) is located at a downward position in FIG. 2 (on the side of turn table) than the latch member 6 (for small-diameter). The roller 3 is omitted in the drawings, however, in response to energizing by energizing means such as spring, the roller 3 presses the disc 2 against the disc guide 4.

At both ends of the disc guide 4 along a direction Y which is perpendicular to the transportation direction X of the disc 2 and along the transportation plane of the disc, supporting shafts 7 are provided. The supporting shaft 7 is provided along the perpendicular direction Y. A disc selecting lever 8 is oscillatably journaled by the supporting shaft 7. The disc selecting lever 8 is journaled at the center portion of the longitudinal direction. As a result, the disc selecting lever 8 is provided along the transportation direction X at the position slightly upward from a transportation track of the disc 2. The disc selecting lever 8 is provided with projecting portions 8a, 8b. The projecting portions 8a, 8b are provided at both end positions of the lever 8 which are opposite with the supporting shaft 7 being sandwiched therebetween, and project on the side of the disc to be transported.

The projecting portions 8a, 8b both abut on the disc 2A to push down the disc 2A when the large-diameter disc 2A is transported, whereas the projecting portions 8a, 8b both do not abut on the disc 21 or at last one of them does not abut on the disc 2B when the small-diameter disc 2B is transported. For achieving such actions, the distance of separation between the supporting shafts 7, 7 and the distance of separation between the projecting portion 8a and the projecting portion 8b are determined.

Furthermore, the disc player comprises a turn table 9, a clamper 10, a clamper arm 12 and a clamper holding plate 13.

The turn table 9 allows rotating operation of the disc 2 having been transported and placed on the turn table 9. The clamper 10 presses the disc 2 placed on the turn table 9 against the turn table 9. The clamper arm 12 is oscillatably journaled by a supporting shaft 11, as its proximal end portion being the center of support. The clamper arm 12 rotatably supports the clamper 11 at its oscillating distal end portion, and functions so that the clamper 10 separates from the turn table 9 at the time of transportation of the disc 2. The clamper holding plate 13 is interposed between the clamper 10 and the clamper arm 12 to rotatably support the clamper 10.

The clamper arm 12 is provided with first and second openings 14, 15. The first opening 14 is formed at the position where the front end portion of the large-diameter disc 2A having been transported abuts in such a size that the disc 2A penetrates therethrough and projects therefrom. The second opening 15 is formed at the position where the front end portion of the small-diameter disc 2B having been transported abuts in such a size that the disc 2B penetrates therethrough and projects therefrom.

End edges 14a, 15a located on the disc guide side of the first and second openings 14, 15 are formed into a curved-shape, for example, arcuate shape so that only both end portions 2a of the discs 2A, 2B abut thereto.

In the drawings, the reference numeral 31 denotes a traverse substrate, the reference numeral 32 denotes a trigger lever and the reference numeral 33 denotes a slider. The trigger lever 32 causes the slider 33 to operate upon detection that the disc 2 has reached the playback position and is oscillatably supported by a supporting shaft 34. The trigger lever 32 comprises abutment portions 32a, 32b, 32c. The abutment portion 32a comes into abutment with the large-diameter disc 2A when the disc 2A reaches the playback position, thereby causing the trigger lever 32 to oscillate. The abutment portion 32c comes into abutment with the small-diameter disc 2B when the disc 2B reaches the playback position, thereby causing the trigger lever 32 to oscillate. The abutment portion 32b comes into abutment with the slider 33 by oscillation of the trigger lever 32 to push the same.

The slider 33 is provided with a supporting portion 33a. The supporting portion 33a is formed by a projecting piece which projects to the clamper arm side, and abuts with a supporting portion 12a provided on the clamper arm 12 to lift the clamper arm 12. Abutment of the supporting portion 33a allows the clamper 10 to be held at the position slightly separated from the turn table 9.

The slider 33 thus constituted allows oscillating operation of the clamper arm 12 by being pushed by the abutment portion 32b, and as a result of this, the clamper 10 presses the disc 2 against the turn table 9.

Operation of the disc player having the above-mentioned configuration will be explained. At first, operation of the disc player in the case where the large-diameter disc 2A is transported will be explained on the basis of FIGS. 1 and 2.

As the photo sensor (omitted in the drawings) detects that the large-diameter disc 2A is inserted from the insertion opening 1, the roller 3 is rotated by a driving motor (omitted in the drawings), and the disc 2A is drawn into the interior by means of the roller 3. At this time, the disc 2A is pressed against the disc guide 4 by the roller 3. Then the position of the disc 2A is restricted by the guide portions 4a, 4b of the disc guide 4. In this connection, the guide portion 4a located on the front side of the transportation direction X projects toward the roller side than the guide portion 4b of the rear side. Accordingly, the disc 2A, as shown in FIG. 2, is transported in the position that the front end portion of the rear side of the transportation direction X is slightly higher.

As the disc 2A is transported by the roller 3, both of the projecting portions 8a, 8b provided on the disc selecting lever 8 disposed at both ends of the disc guide 4 come into abutment with the surface of the disc 2A. Since the disc selecting lever 8 can oscillate along the clockwise direction and the counterclockwise direction in FIG. 2, at first the projecting portion 8a provided on the front side of the transportation direction X comes into abutment with the disc 2A. Then as the transportation proceeds, the disc 2A also comes into abutment with the projecting portion 8b on the rear side while still abutting with the projecting portion 8a. As a consequence, the disc 2A is pushed down on its front end side of the transportation direction X, in response to the reaction resulting from abutting with both of the projecting portions 8a, 8b, so that the position of the disc 2A becomes such that the front end side is lowered in comparison with the beginning of the transportation.

For this reason, the disc 2A continues to be transported without being abutted with the small-diameter disc latch member 6. Then, as the projecting portion 8a of the disc selecting lever 8 comes off the disc 2A, the disc selecting lever 8 oscillates in the counterclockwise direction in FIG. 2, with the result that only the projecting portion 8b abuts with the disc 2A and the front end portion in the transportation direction X of the disc 2A rises. The front end portion in the transportation direction X thus risen comes into contact with the supporting shaft side of the clamper arm 12 formed in right-downward state. Accordingly, the disc 2A approaches to the turn table 9 while being transported in the condition of being pushed down along the clamper arm 12.

As the disc 2A transported along the clamper arm 12 comes into contact with the turn table 9, there is a possibility that the disc 2A is injured by the turn table 9. However, the clamper arm 12 is provided with the first opening 14, and the end edge of the transported disc 2A penetrates through the first opening 14 and projects to the outside of the clamper arm 12. Therefore, the disc 2A is not pushed down until it comes into contact with the turn table 9. Furthermore, since the end edge 14a of the first opening 14 has a curved shape which abuts only with the both end portions 2a of the disc 2A, the disc 2A is effectively prevented from being injured by the end edge 14a.

Finally, the transported disc 2A is received and latched by the latch member 5, thereby reaching the playback position. As the disc 2A reaches the playback position, the abutment portion 32a of the trigger lever 32 is pushed by the end surface thereof. Then, the trigger lever 32 oscillates about the supporting shaft 34 to push the slider 33 by means of the abutment portion 32b. As a result of this, the slider 33 starts moving operation.

The supporting portion 33a of the slider 33 having started moving operation separates from the supporting portion 12a of the clamper arm 12. Then, the clamper arm 12 oscillates about the supporting shaft 11 in the counterclockwise direction in the drawings by the action of the clamper arm spring (omitted in the drawings). As a result of this, the clamper 10 presses the disc 2A against the turn table 9, and thereafter playback of the disc 2A is carried out.

Next, operation of the disc player in the case where the small-diameter disc 2B is transported will be explained with reference to FIGS. 3 and 4.

As the photo sensor (omitted in the drawings) detects that the small-diameter disc 2B is inserted from the insertion opening 1, the roller 3 is rotated by a driving motor (omitted in the drawings), and the disc 2B is drawn into the interior by means of the roller 3. At this time, the disc 2B is pressed against the disc guide 4 by the roller 3. Then the position of the disc 2B is restricted by the guide portions 4a, 4b of the disc guide 4. In this connection, the guide portion 4a located on the front side of the transportation direction X projects toward the roller side than the guide portion 4b of the rear side. Accordingly, as is the case of 2A, also the disc 2B, as shown in FIG. 4, is transported in the position the front end portion of the rear side of the transportation direction X is slightly higher.

The disc 2B being transported then comes into contact with the clamper arm 12, and is transported as it is by the roller 3 up to the area where the front end portion is allowed to penetrate from the second opening 15 provided on the clamper arm 12. That is, during transportation period of the disc 2B, the projecting portions 8a, 8b of the disc selecting lever 8 do not contact with the disc 2B, and hence it will not occur that the disc 2B is pushed down by the projecting portions 8a, 8b. Accordingly, the disc 2B is transported in the condition that the height position is kept as it is. In connection with this, the clamper arm 12 is provided with the second opening 15 which allows the end edge of the disc 2B to penetrate through the clamper arm 12 and project to the outside, and the end edge of the transported disc 2B penetrates through the second opening 15 and projects outside the clamper arm 12. For this reason, though the end portion of the clamper arm 12 located on the supporting shaft 11 side is formed into a right-downward shape for pushing down the front end portion of the disc 2B toward the turn table 9, it will not occur that the disc 2B is pushed down toward the turn table 9 side to come into contact therewith. Furthermore, since the end edge 15a of the second opening 15 has a curved shape which abuts only with the both end portions 2a of the disc 2B, the disc 2B is effectively prevented from being injured by the end edge 15a.

Finally, the transported disc 2B is received and latched by the latch member 6, thereby reaching the playback position. As the disc 2B reaches the playback position, the abutment portion 32c of the trigger lever 32 is pushed by the end surface thereof. Then, the trigger lever 32 oscillates about the supporting shaft 34 to push the slider 33 by means of the abutment portion 32c. As a result of this, the slider 33 starts moving operation.

The supporting portion 33a of the slider 33 having started moving operation separates from the supporting portion 12a of the clamper arm 12. Then, the clamper arm 12 oscillates about the supporting shaft 11 in the counterclockwise direction in the drawings by the action of the clamper arm spring (omitted in the drawings). As a result of this, the clamper 10 presses the disc 2B against the turn table 9, and thereafter playback of the disc 2B is carried out.

In FIGS. 3 and 4, the disc 2B is described as being inserted from the center position of the width direction of the insertion opening 1. However, there is a case that the disc 2B is inserted from the end position of the insertion opening 1. Operations of the disc player which are different in this case will be pointed out and explained with reference to FIGS. 5 and 6. That is, in the case where the disc 2B is inserted from the end portion of the insertion opening 1, as same as the case where the disc 2A is inserted, the projecting portions 8a, 8b of the disc selecting lever 8 are brought into abutment with the surface of the disc 2B. In this case, since the disc 2B is of small-diameter, the projecting portion 8a will separate from the disc 2B during the period before the disc 2B abutted with the projecting portion 8a on the front side of the transportation direction is transported to come into abutment with the projecting portion 8b of the rear side. Therefore, it will not occur that both of the projecting portions 8a, 8b abut with the disc 2B during transportation, but either one of the projecting portions 8a, 8b abuts with the disc 2B. Therefore, it will not occur that the disc 2B is pushed down by the projecting portions 8a, 8b, so that the disc 2B is transported to the playback position in the same manner as the case where it is inserted from the center position, even thought the disc 2B has been inserted from the end position of the insertion opening 1.

Figure 7:
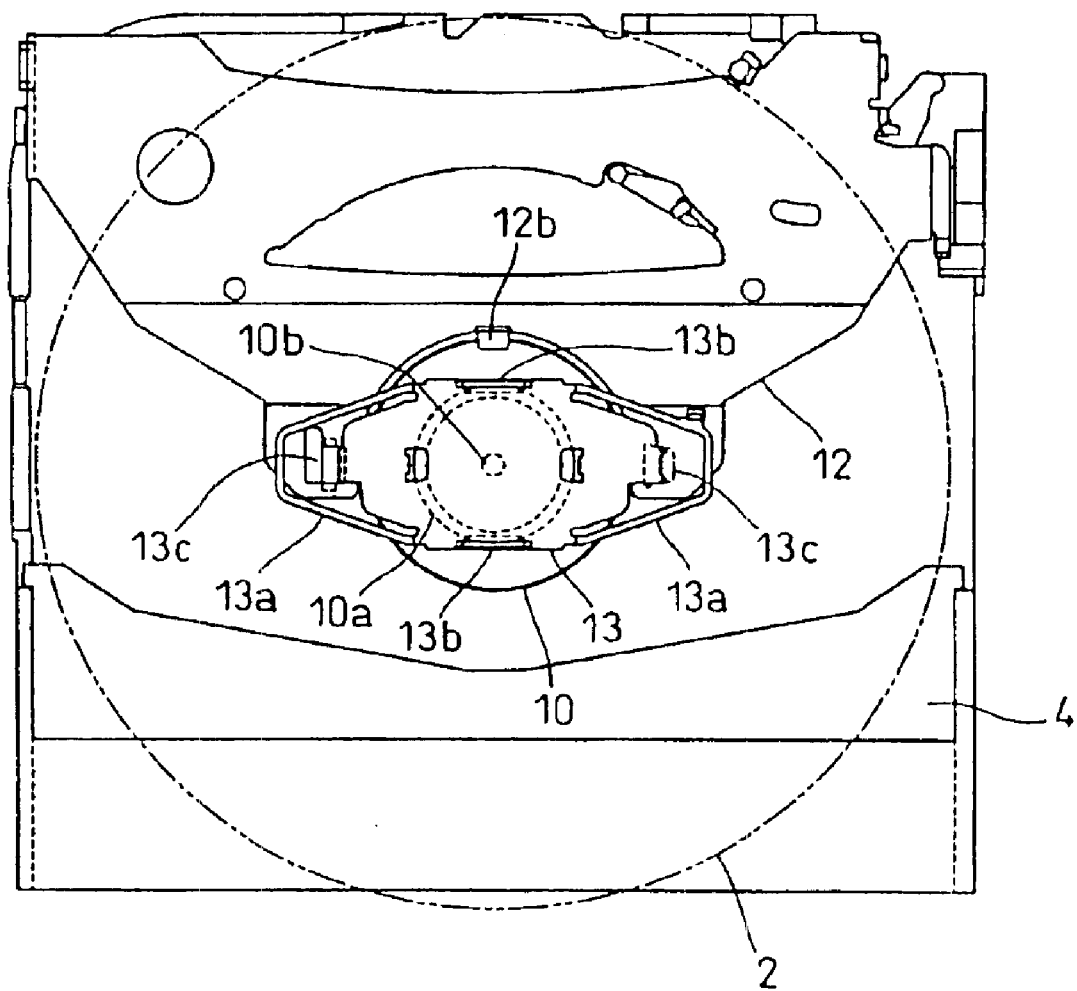
FIG. 7 is a plane structural view of the disc player according to another improved embodiment, in a playback state of the disc.
Figure 8:
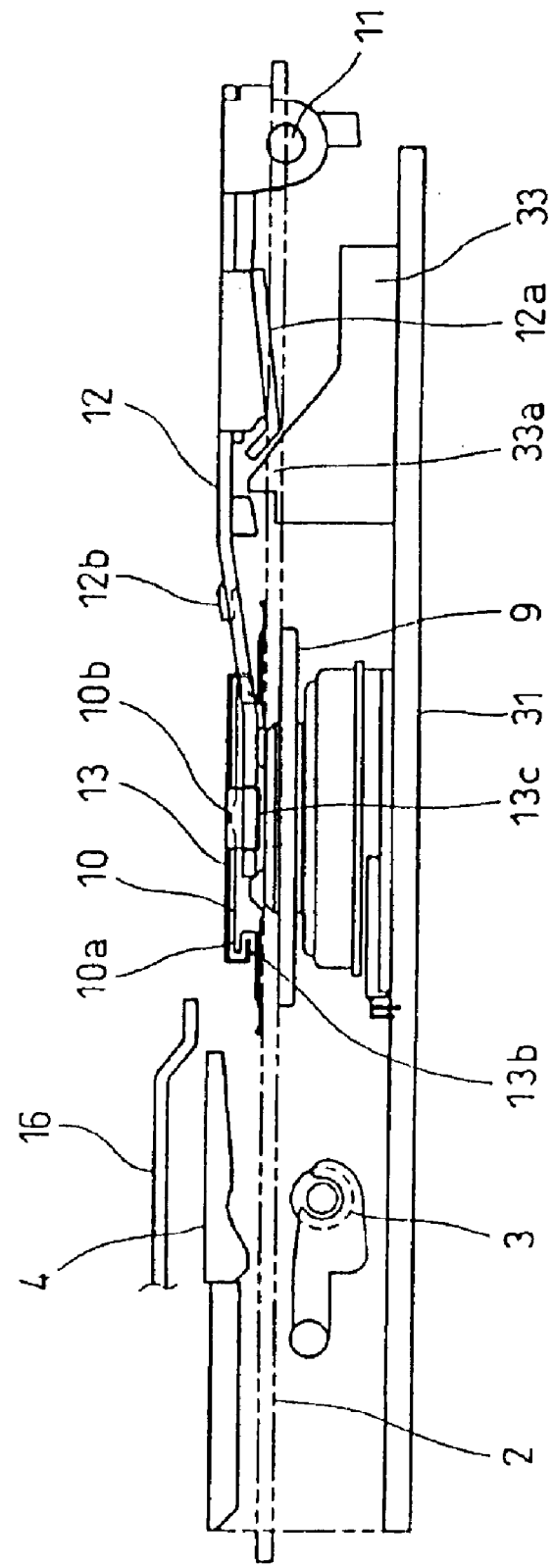
FIG. 8 is a side structural view of the disc player according to the improved embodiment, in the playback state of the disc.
Figure 9:
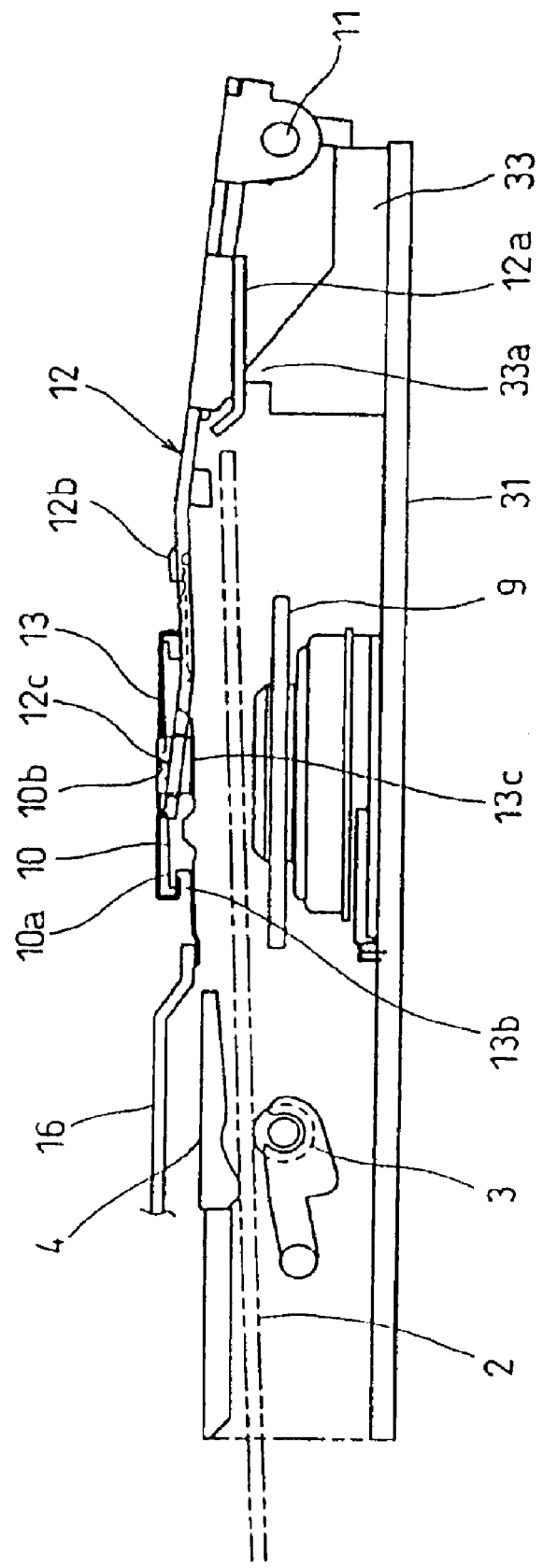
FIG. 9 is a side structural view of the disc player according to the improved embodiment, in an exchange state of the disc.

It is more preferable that the above-mentioned embodiment is configured as follows. FIG. 7 is a plane view of a disc player according to another improved embodiment, FIGS. 8 and 9 are side structural views of the disc player, and FIGS. 7 and 8 show a playback state of the disc. FIG. 9 shows an exchange state of the disc. Incidentally, in FIGS. 7 to 9, the same/corresponding member or part as/to that of FIGS. 1 to 6 is denoted by the same reference numeral, and detailed description thereof will be omitted.

This disc player comprises a restricting member 16, a supporting portion 12b, an energizing portion 13a and an engagement portion 13b.

The restricting member 16 positions and restricts one end portion of the clamper 10 having separated from the turn table 9, and is fixedly supported by, for example, a casing (omitted in the drawings) constituting the disc player. The supporting portion 12b is provided in the clamper arm 12, and positions and supports the other end portion of the clamper 10 having separated from the turn table 9. The other end portion of the clamper 10 used herein refers to a portion opposing to the above-mentioned one end portion of the clamper 10 with the clamper 10 being sandwiched therebetween. The energizing portion 13a and the engagement portion 13b are provided on the clamper holding plate 13. The energizing portion 13a energizes the clamper 10 in the direction of separating from the clamper arm 12. The engagement portion 13b engages with the clamper 10 to separate the clamper 10 from the disc 2. More specifically, on the periphery of the clamper 10 is provided an engagement portion 10a elongating outside of the radial direction, and the engagement portion 13a engages with the engagement portion 10a, thereby separating the clamper 10 from the disc 2.

In the following, more detailed description will be made. At the center position of the clamper 10 is provided a projecting portion 10b. The projecting portion 10b contacts with the clamper holding plate 13, thereby rotatably supporting the clamper 10 with respect to the clamper holding plate 13. At both side positions of the clamper 13, the energizing portion 13a which is formed of, for example, a flat spring of thin arm shape is provided, and the clamper arm 12 is pushed via this energizing portion 13a. Therefore, the clamper holding plate 13 is energized in the direction of separating from the clamper arm 12. The clamper holding plate 13 has a pair of engagement portions 13c, 13c disposed so as to oppose with each other along the direction approximately parallel to the axial direction of the clamper arm 12 (axial direction of the supporting shaft 11), and engages with the clamper arm 12 via these engagement portions 13c, 13c. Therefore, at the time of playback, the clamper holding plate 13 and the clamper arm 12 are kept parallel with each other.

In the case of exchanging or drawing out the disc 2 in the disc player having the aforementioned configuration, as shown in FIG. 9, the supporting portion 33a of the slider 33 lifts the supporting portion 12a of the clamper arm 12. Then, the clamper arm 12 oscillates about the supporting shaft 11 in the clockwise direction in the drawing, and the clamper 10 is lifted by this oscillation. Then, one end portion of the lifted clamper 10 (left end in the drawing) is positioned and restricted by the restricting member 16. As the clamper arm 12 further oscillates in the clockwise direction, the other end portion of the clamper 10 (right end in the drawing) rises, and the risen other end comes into abutment with the supporting portion 12b of the clamper arm 12 to be positioned and supported. Therefore, if the amount of oscillation of the clamper arm 12 is constant on every occasion, the position of the clamper 10 is restricted in the above state. However, the clamper arm 12 is supported by the supporting portion 33a of the slider 33 via the supporting portion 12a, and the supporting portion 12a is provided on its oscillation fulcrum (supporting shaft 11) side. On the other hand, the clamper arm 12 supports the clamper holding plate 13 via a supporting portion 12c, and the supporting portion 12c is provided on the oscillating distal end side. Therefore, the supporting portion 12a and the supporting portion 12c are provided so as to be separated from each other, and for this reason, more or less errors may occur in terms of movement amount of the clamper 10.

In view of the above, for avoiding such a disadvantage, in the present disc player, the clamper arm 12 is configured to further oscillate over a little range. That is, the clamper holding plate 13 is energized in the direction of separating from the clamper arm 12 by the energizing portion 13a while leaving some mechanical allowance in the upward/downward direction with respect to the clamper arm 12. As a consequence, the amount oscillation of the clamper 12 slightly increases, and even if the clamper arm 12 approaches the clamper holding plate 13 opposing to the energizing force of the energizing portion 13a, the movement is absorbed by the slight mechanical allowance in the upward/downward direction with respect to the clamper arm 12, possessed by the clamper holding plate 13. Therefore, even if there is a little error in the amount of oscillation of the clamper arm 12, the position of the clamper 10 is restricted properly, so that it would be eliminated that the clamper 10 positioned and restricted by the restricting member 16 and the supporting portion 12c rattles.

Figure 12:
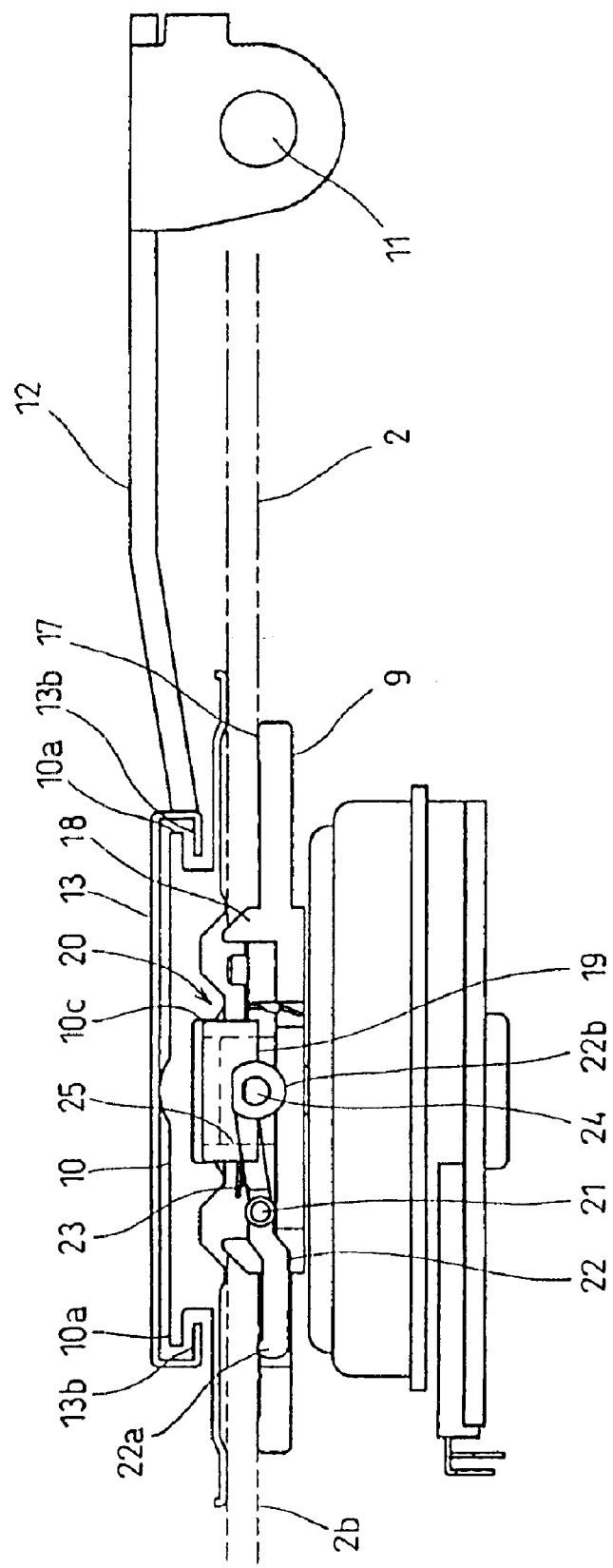
FIG. 12 is a side structural view of the turn table provided for the disc player according yet another improved embodiment, in an attachment state of the disc.
Figure 13:
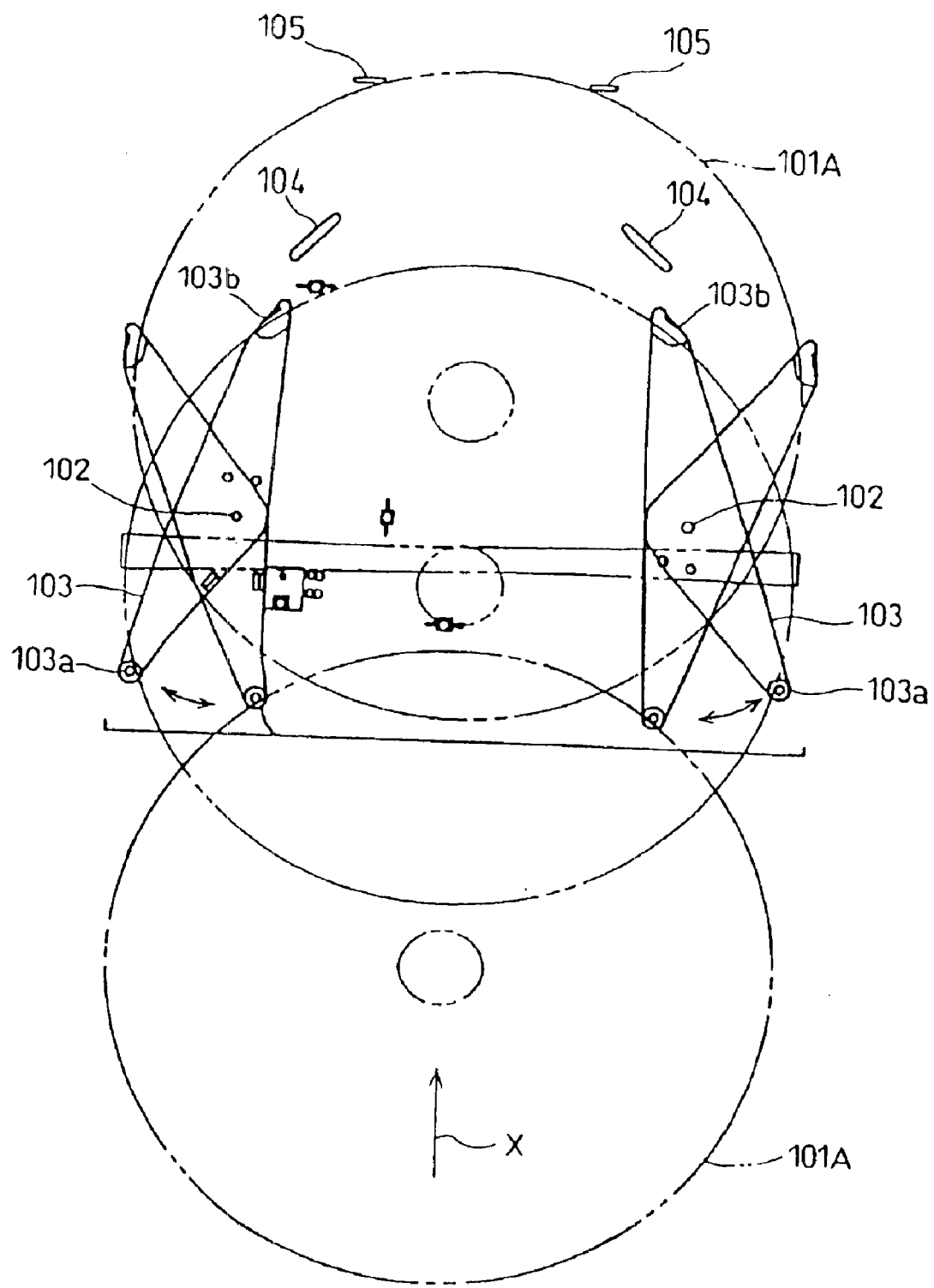
FIG. 13 is a plane structural view of a disc player according to a conventional embodiment, in the case where the disc to be transported is of large-diameter.
Figure 14:
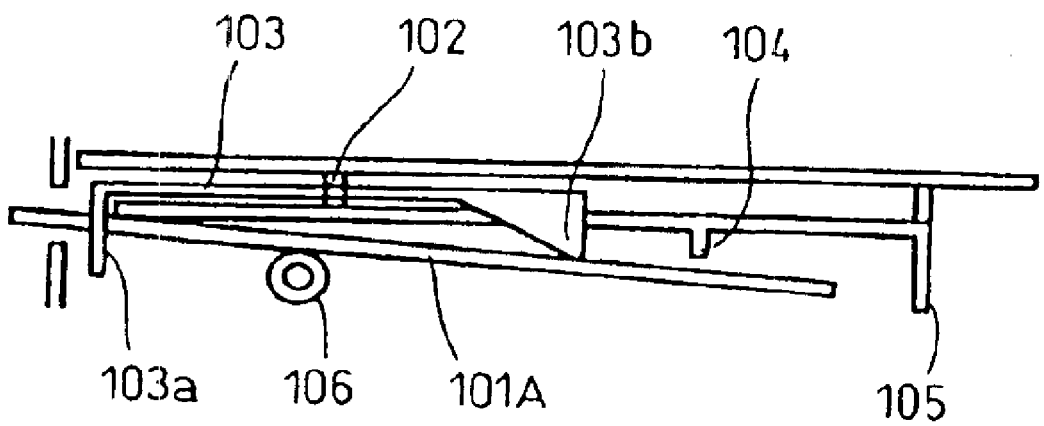
FIG. 14 is a side structural view of the disc player according to the conventional embodiment, in the case where the disc to be transported is of large-diameter.
Figure 15:
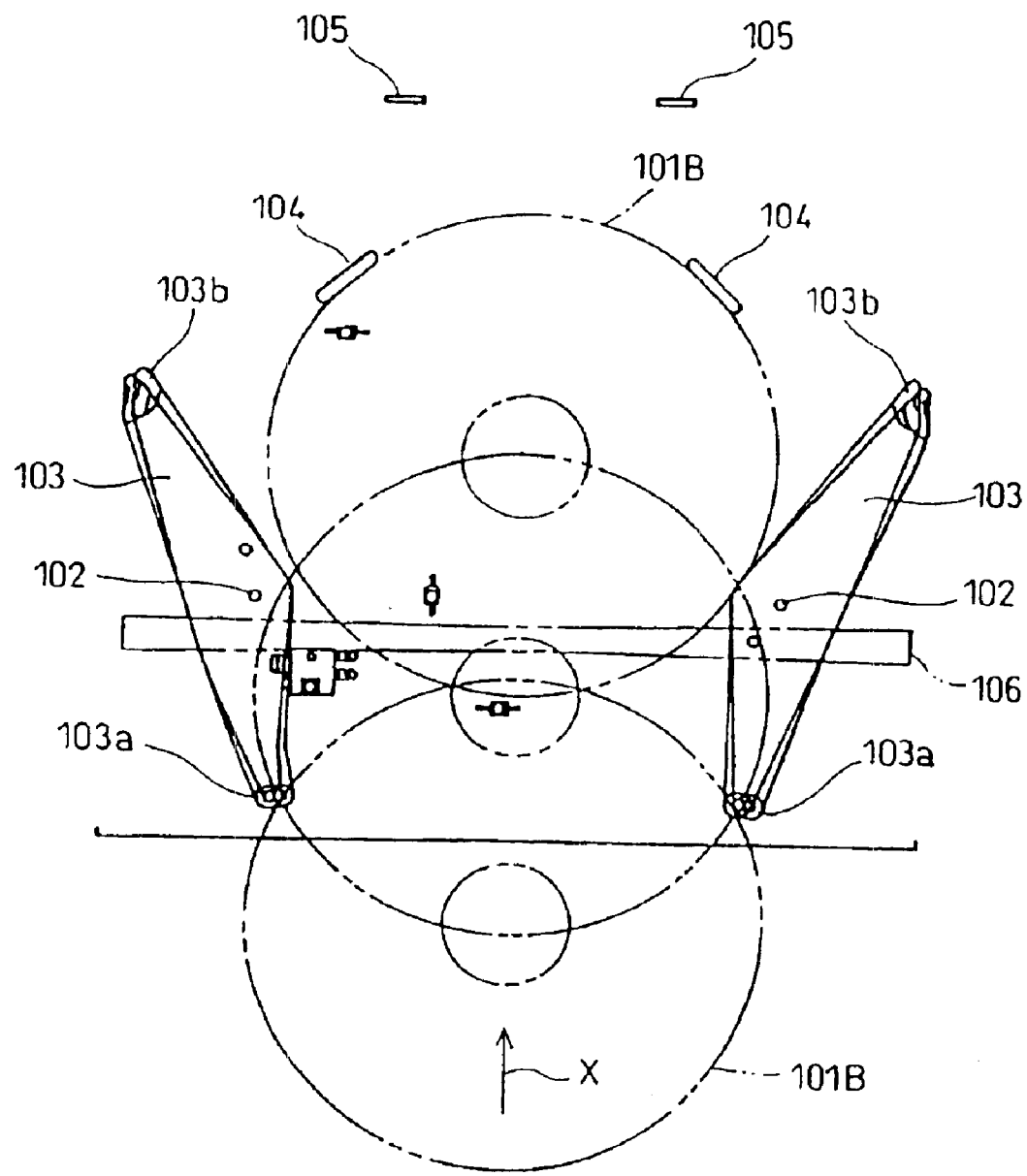
FIG. 15 is a plane structural view of the disc player according to the conventional embodiment, in the case where the disc to be transported is of small-diameter.
Figure 16:
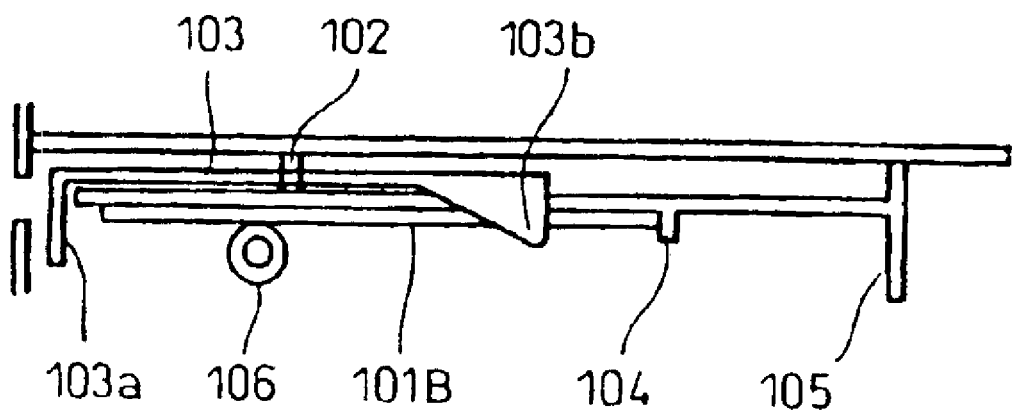
FIG. 16 is a side structural view of the disc player according to the conventional embodiment, in the case where the disc to be transported is of small-diameter.
Figure 17:
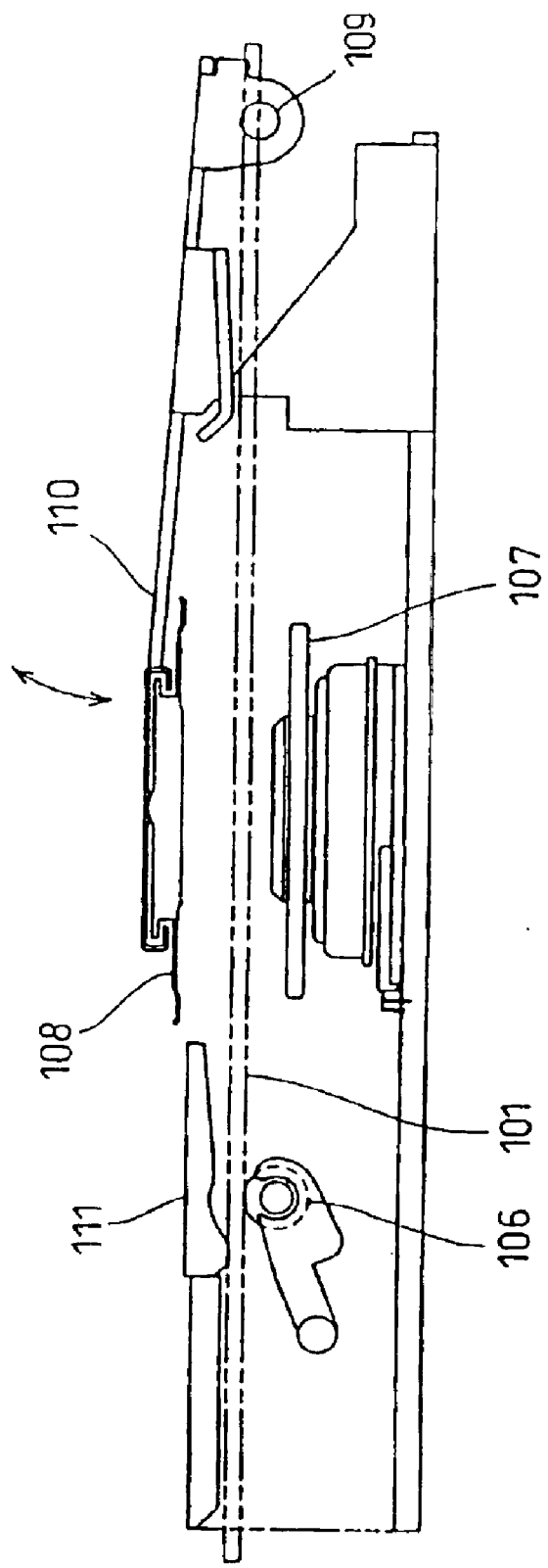
FIG. 17 is a side structural view of the disc player according to the conventional embodiment.
Figure 18:
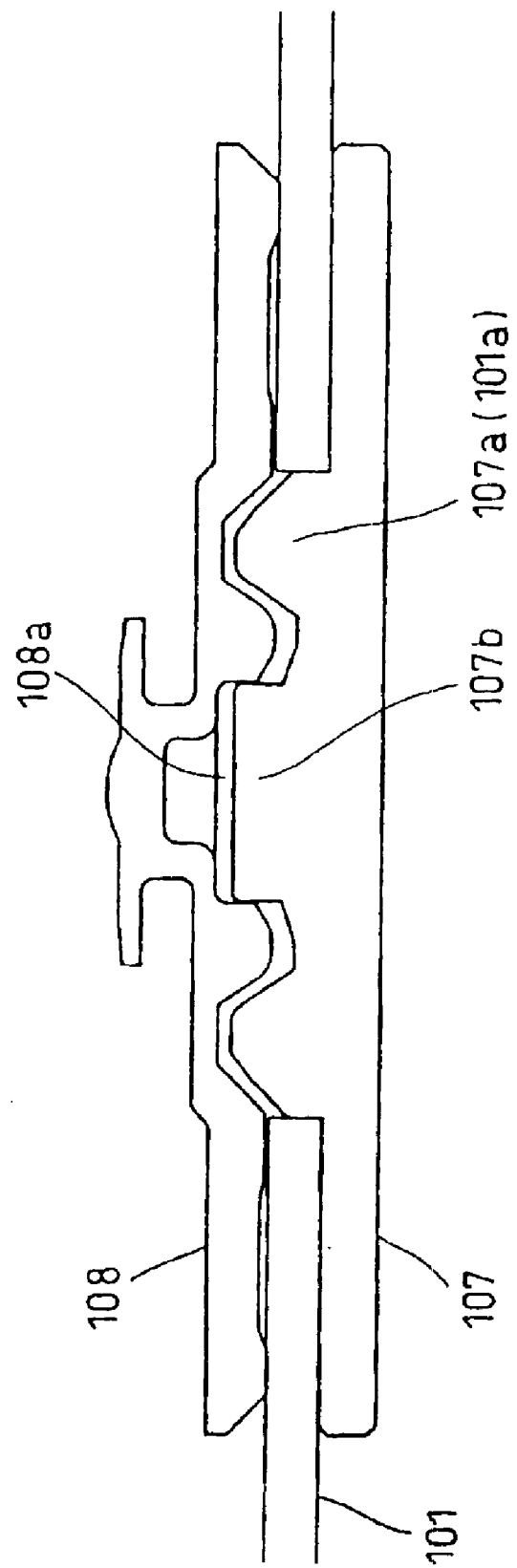
FIG. 18 is a structural view of a clamp according to the conventional embodiment.

FIG. 10 is a plane structural view of a turn table of the another improved disc player, and FIGS. 11 and 12 are side structural view of the turn table. FIGS. 10 and 11 show a standby state, and FIG. 12 shows an attachment state of the disc. In FIGS. 10 to 12, the same/corresponding part or portion as/to that of FIGS. 1 to 9 is denoted by the same reference numeral, and detailed description thereof will be omitted.

This disc player further comprises a disc supporting portion 17, a projecting portion 18, a main body member 19, a clamper engagement portion 20, a turn table engagement portion 10c, an operation lever 22 and energizing means 23.

The disc supporting portion 17, the projecting portion 18 and the clamper engagement portion 20 are provided on the turn table 9. The disc supporting portion 17 supports the disc 2 placed on the turn table 9. The projecting portion 18 has a circular shape capable of fitting into the center hole (omitted in the drawing) of the disc 2, and is provided at the center of the disc supporting portion 17. The clamper engagement portion 20 is provided inside in the radial direction of the projecting portion 18. The clamper engagement portion 20 has the main body member 19, and enables the main body member 19 to perform advancing/retracting operation along the axial direction of the turn table 9. The main body member 19 performs advancing/retracting operation inside/outside of the projecting portion 18, or in other words, is a centering ring advancing/retracting along the upward/downward direction in FIGS. 11 and 12.

The turn table engagement portion 10c is configured so as to engage with the main body member 19 having performed advancing operation, and provided in the clamper 10.

The operation lever 22 is a centering lever, and rotatably journaled by a supporting shaft 21 fixed to the projecting portion 18. One end portion 22a of the operation lever 22 projects above the disc supporting portion 17. The other end portion 22b of the operation lever 22 engages with a supporting shaft 24 elongated from the side surface of the main body member 19, whereby the main body member 19 is rotatably attached to the other end portion 22b of the operation lever 22.

The energizing means 23 is means for causing the main body member 19 to perform retracting operation via the operation lever 22 and formed of, for example, a flat spring.

With such a configuration, the operation lever 22 causes the main body member 19 to perform advancing operation via the supporting shaft 24 connected with the other end portion 22b, when the one end portion 22a of the operation lever 22 is pushed by the placed disc 2. On the other hand, in the state that the disc 2 is not placed, it causes the main body portion 19 to perform retracting operation inside the projecting portion 18 under the action of the energizing means 23.

In this disc player, the following operation is carried out. As the disc 2 is placed on the disc supporting portion 17 so as to be concentric with the turn table 9, a clamp surface 2b of the disc 2 pushes the one end portion 22a of the operation lever 22 downwardly. As a result of this, the operation lever 22 rotates about the supporting shaft 21 in the counterclockwise direction in FIG. 11. As a consequence, the other end portion 22b of the operation lever 22 rises, and the main body member 19 connected to the other end portion 22b performs advancing operation while being guided by a guide 25. Incidentally, the guide 25 is formed of a column body provided on the turn table, and arranged with being inserted into the main body member 19.

After that, as the clamper arm 12 oscillates about the supporting shaft 11 along the counterclockwise direction in FIGS. 11 and 12, the clamper holding plate 13 and the clamper 10 move down toward the disc 2 placed on the turn table 9. Then the turn table engagement portion 10c of the clamper 10 fits with the main body member 19 performing advancing operation, to be positioned in the state that the rotation centers of the turn table 9 and the clamper 10 correspond with each other, with the result that the rotation centers of the disc 2, the turn table 9 and the clamper 10 come into coincident with each other.

INDUSTRIAL APPLICABILITY

According to the present invention, in the case where the disc to be transported is of large-diameter, both of the projecting portions of the disc selecting lever disposed on both ends of the disc guide come into abutment with the disc to push down the disc, while on the other hand, in the case where the disc is of small-diameter, both or at least one of the projecting portions of the disc selecting lever does not abut, so that the disc will not be pushed down. Accordingly, it becomes possible to determine whether the disc is of large-diameter or small-diameter and reliably transport the large-diameter and small diameter discs up to the respective playback positions with the use of the disc selecting lever which significantly downsized compared to the conventional oscillating lever. For this reason, by employing this configuration, the necessity of such a large installation space as conventional is eliminated, and an advantage that the thickness of the whole disc player can be decreased is obtained.

Furthermore, since the front end portion of the disc being transported can projects out while penetrating through the opening of the clamper arm, so that it cannot occur that the disc of which front end portion is pushed by the clamper arm is pressed against the turn table, and an advantage that the whole surface of the disc is not injured by the end edge of the opening is assured, which makes it possible to decrease the whole thickness while assuring the above advantages.

Furthermore, since the mechanical allowance between the clamper and the clamper arm is secured by the clamper holding plate, not only the advantage that the portion of the clamper can be kept in a stable manner, but also the advantage that the space required for transportation of the disc is sufficiently secured to prevent the disc from being injured are assured, and it is possible to realize decrease in the thickness while assuring these advantages.

In addition, since the main body member of the clamper engagement portion which is an obstacle during transportation of the disc, namely, the main body member of the clamper engagement portion provided on the turn table performs retracting operation into the projecting portion during transportation of the disc, a disadvantage that the disc is injured will not occur. Furthermore, since the rotation axes of the disc and the turn table are brought into coincident with each other by means of the projecting portion of the turn table, and the rotation axes of the clamper and the turn table are brought into coincident with each other via the main body member of the clamper engagement portion having performed advancing operation, it is possible to assure an advantage that rotation centers of these disc, turn table and clamper are easily made in correspondence with each other.

What is claimed is:

1. A disc player comprising:
    a roller for transporting a disc;
    a disc guide, provided opposite to said roller along a disc transportation direction, for guiding the disc being transported;
    a disc selecting lever provided at each end along the direction perpendicular to the disc transportation direction, of which center portion along the disc transportation direction is oscillatably journaled about an axis along the direction perpendicular to the disc transportation direction;
    projecting portions provided at each both ends of said disc selecting lever along the disc transportation direction so as to project toward the disc side, both of which the projecting portions abut on the disc to push down the disc when a large-diameter disc is transported, whereas both or at least one of which projecting portions does not abut on the disc when a small-diameter disc is transported;
    a large-diameter latch member for receiving and latching the large-diameter disc having reached a terminal end of transportation after being pushed down by said projecting portions; and
    a small-diameter latch member for receiving and latching the small-diameter disc having reached a terminal end of transportation,
    wherein said axis, about which said disc selecting lever is oscillatably journaled, is also substantially parallel to a plane defined by an upper surface of said disc.

2. The disc player according to claim 1 further comprising:
    a turn table on which the disc transported by said roller is placed, for allowing rotating operation of the disc;
    a clamper arm journaled so as to capable of oscillating;
    a clamper holding plate provided on the oscillating distal end side of said clamper arm; and
    a clamper rotatably supported on said clamper arm via said clamper holding plate, which clamper separates from said turn table during transportation of the disc in accordance with oscillating operation of said clamper arm, whereas presses the disc against said turn table when the disc is placed on said turn table;
    said turn table being provided with a disc supporting portion for supporting the disc; a projecting portion provided inwardly in the radial direction from said disc supporting portion, to be fitted into a center hole of the disc; and a clamper engagement portion provided inwardly in the radial direction from said projecting portion, performing advancing/retracting operation along the axial direction of said turn table,
    said clamper being provided with a turn table engagement portion to be engaged with said clamper engagement portion having performed advancing operation.

3. A disc player comprising:
    a roller for transporting a disc;
    a disc guide, provided opposite to said roller along a disc transportation direction, for guiding the disc being transported;
    a disc selecting lever provided at each end along the direction perpendicular to the disc transportation direction, of which center portion alone the disc transportation direction is oscillatably journaled about an axis along the direction perpendicular to the disc transportation direction;
    projecting portions provided at each both ends of said disc selecting lever along the disc transportation direction so as to project toward the disc side, both of which the projecting portions abut on the disc to push down the disc when a large-diameter disc is transported, whereas both or at least one of which projecting portions does not abut on the disc when a small-diameter disc is transported;
    a large-diameter latch member for receiving and latching the large-diameter disc having reached a terminal end of transportation after being pushed down by said projecting portions;
    a small-diameter latch member for receiving and latching the small-diameter disc having reached a terminal end of transportation;

a turn table on which the disc transported by said roller is placed, for allowing rotating operation of the disc;

a clamper arm journaled so as to capable of oscillating;

a clamper holding plate provided on the oscillating distal end side of said clamper arm; and a clamper rotatably supported on said clamper arm via said clamper holding plate, which clamper separates from said turn table during transportation of the disc in accordance with oscillating operation of said clamper arm, whereas presses the disc against said turn table when the disc is placed on said turn table;

said turn table being provided with a disc supporting portion for supporting the disc; a projecting portion provided inwardly in the radial direction from said disc supporting portion, to be fitted into a center hole of the disc; and a clamper engagement portion provided inwardly in the radial direction from said projecting portion, performing advancing/retracting operation along the axial direction of said turn table, said clamper being provided with a turn table engagement portion to be engaged with said clamper engagement portion having performed advancing operation, wherein said clamper engagement portion has:

an operation lever with one end portion projecting above said disc supporting portion, and the other end portion performing advancing/retracting operation with respect to said disc supporting portion in accordance with presence/absence of the pushing operation of the disc with respect to said one end portion;

a main body member connected to the other end portion of said operation lever; and energizing the other end portion of said operation lever toward the direction separating from said disc supporting portion.

* * * * *

UNITED STATES PATENT AND TRADEMARK OFFICE
CERTIFICATE OF CORRECTION

| | |
|---|---|
| PATENT NO. | : 6,891,780 B1 |
| DATED | : May 10, 2005 |
| INVENTOR(S) | : Shingo Kage et al. |

It is certified that error appears in the above-identified patent and that said Letters Patent is hereby corrected as shown below:

Title page,
The number of claims should read as -- 7 -- not "3".

Column 14,
Line 17, insert:
--      2.      The disc player accroding to claim 1 further comprising:
        a turn table on which the disc transported by said roller is placed, for allowing rotating operation of the disc;
        a clamper arm journaled so as to be capable of oscillating;
        a clamper rotatably supported on the oscillating distal end side of said clamper arm, which clamper separates from said turn table at the time of transportation of the disc in accordance with oscillating operation of said clamper arm, whereas presses the disc against said turn table when the disc is placed on said turn table; and
        an opening provided in said clamper arm, through which a front end portion in the transportation direction of the disc being transported penetrates and projects there from.

3.      The disc player according to claim 2, wherein the end edge located on the disc guide side of said opening has a curved shape which abuts only both ends of the disc.

4.      The disc player according to claim 1 further comprising:
        a turn table on which the disc transported by said roller is placed, for allowing rotating operation of the disc;
        a clamper arm journaled so as to be capable of oscillating;
        a clamper holding plate provided on the oscillating distal end side of said clamper arm;
        a clamper rotatably supported on said clamper arm via said clamper holding plate, which clamper separates from said turn table during at the time of the disc in accordance with oscillating operation of said clamper arm, whereas presses the disc against the turn table when the disc is placed on said turn table;
        a restricting member for positioning and restrictng one end portion of said clamper having separated from said turntable; and
        a supporting portion provided in said clamper arm, for positioning and supporting the other end portion of said clamper having separated from said turn table,
        said clamper holding plate being provided with an energizing portion for energizing said clamper toward the direction of separating from said clamper arm.

5.      The disc player according to claim 4, wherein said clamper is supported by said clamper arm in the condition that more or less movement along the oscillating direction of the clamper arm is allowed. --.

UNITED STATES PATENT AND TRADEMARK OFFICE
CERTIFICATE OF CORRECTION

PATENT NO.     : 6,891,780 B1
DATED          : May 10, 2005
INVENTOR(S)    : Shingo Kage et al.

It is certified that error appears in the above-identified patent and that said Letters Patent is hereby corrected as shown below:

Column 14 (cont'd),
Line 17, change "2." to -- 6. --.
Line 42, change "3." to -- 7. --.

Signed and Sealed this

Sixth Day of September, 2005

JON W. DUDAS
*Director of the United States Patent and Trademark Office*